United States Patent
Dunlap et al.

(10) Patent No.: US 12,322,823 B2
(45) Date of Patent: Jun. 3, 2025

(54) STRUCTURALLY REINFORCED ENCLOSURE COVERS FOR TRACTION BATTERY PACKS

(71) Applicant: FORD GLOBAL TECHNOLOGIES, LLC, Dearborn, MI (US)

(72) Inventors: Brock Dunlap, Dearborn, MI (US); Mohammadreza Eftekhari, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 304 days.

(21) Appl. No.: 17/937,011

(22) Filed: Sep. 30, 2022

(65) Prior Publication Data

US 2024/0113374 A1 Apr. 4, 2024

(51) Int. Cl.
*H01M 50/249* (2021.01)
*B60L 50/64* (2019.01)

(52) U.S. Cl.
CPC .......... *H01M 50/249* (2021.01); *B60L 50/64* (2019.02); *H01M 2220/20* (2013.01)

(58) Field of Classification Search
CPC .................... B60K 1/04; B60K 2001/0438
See application file for complete search history.

(56) References Cited

U.S. PATENT DOCUMENTS

| | | | |
|---|---|---|---|
| 11,081,758 B2 | 8/2021 | Czech et al. | |
| 11,084,386 B2 | 8/2021 | Howard et al. | |
| 11,211,656 B2 | 12/2021 | Matecki et al. | |
| 2003/0047366 A1 | 3/2003 | Andrew et al. | |
| 2011/0070478 A1 | 3/2011 | Meschter | |
| 2012/0251863 A1* | 10/2012 | Berger | H01M 50/262 429/99 |
| 2018/0334022 A1 | 11/2018 | Rawlinson et al. | |
| 2018/0337377 A1* | 11/2018 | Stephens | H01M 50/224 |
| 2019/0044203 A1* | 2/2019 | Haag | H01M 50/229 |
| 2019/0221802 A1* | 7/2019 | Maguire | H01M 50/211 |
| 2019/0334136 A1* | 10/2019 | Eftekhari | H01M 50/24 |
| 2021/0083343 A1 | 3/2021 | West et al. | |
| 2021/0159567 A1 | 5/2021 | Pires et al. | |
| 2021/0226188 A1* | 7/2021 | Syed | H01M 50/249 |
| 2021/0305544 A1* | 9/2021 | Miloaga | H01M 50/572 |
| 2021/0323418 A1 | 10/2021 | Howard et al. | |
| 2022/0006150 A1 | 1/2022 | Foran et al. | |
| 2023/0106602 A1* | 4/2023 | Wang | H01M 50/249 429/100 |
| 2024/0039103 A1* | 2/2024 | Nurtsch | H01M 50/24 |

FOREIGN PATENT DOCUMENTS

| | | |
|---|---|---|
| CN | 214706141 U | 11/2021 |
| WO | 2020227458 A1 | 11/2020 |
| WO | 2021034420 A1 | 2/2021 |

* cited by examiner

*Primary Examiner* — Brian L Swenson
(74) *Attorney, Agent, or Firm* — David B. Kelley; Carlson, Gaskey & Olds, P.C.

(57) ABSTRACT

Traction battery packs are disclosed for use in electrified vehicles. An exemplary traction battery pack may include an outer enclosure assembly establishing an interior, and a battery array housed within the interior. A polymer-based enclosure cover of the outer enclosure assembly may be structurally reinforced by one or more structural cross-members. The structural cross members are designed to provide structural integrity during both normal operating conditions and thermal/venting events of the traction battery pack.

20 Claims, 3 Drawing Sheets

STRUCTURALLY REINFORCED ENCLOSURE COVERS FOR TRACTION BATTERY PACKS

TECHNICAL FIELD

This disclosure relates generally to electrified vehicle traction battery packs, and more particularly to structurally reinforced enclosure covers for traction battery packs.

BACKGROUND

A high voltage traction battery pack typically powers an electric machine and other electrical loads of an electrified vehicle. The traction battery pack includes a plurality of battery cells and various other battery internal components that are housed inside an outer enclosure assembly for supporting the electric propulsion of the electrified vehicle.

SUMMARY

A traction battery pack according to an exemplary aspect of the present disclosure includes, among other things, an outer enclosure assembly including a structurally reinforced enclosure cover and an enclosure tray. The structurally reinforced enclosure cover includes an overmold portion and a structural cross member inside the overmold portion.

In a further non-limiting embodiment of the foregoing traction battery pack, the structurally reinforced enclosure cover includes a plurality of structural cross members arranged inside the overmold portion.

In a further non-limiting embodiment of either of the foregoing traction battery packs, the structural cross member includes a T-shaped profile.

In a further non-limiting embodiment of any of the foregoing traction battery packs, the overmold portion includes a polymer-based material.

In a further non-limiting embodiment of any of the foregoing traction battery packs, the overmold portion includes a polymer-based composite material.

In a further non-limiting embodiment of any of the foregoing traction battery packs, the polymer-based composite material includes a sheet moulding compound.

In a further non-limiting embodiment of any of the foregoing traction battery packs, the polymer-based composite material includes a direct long fiber thermoplastic.

In a further non-limiting embodiment of any of the foregoing traction battery packs, the polymer-based composite material includes a glass mat thermoplastic (GMT).

In a further non-limiting embodiment of any of the foregoing traction battery packs, the structural cross member includes a metallic material.

In a further non-limiting embodiment of any of the foregoing traction battery packs, the structural cross member includes an unidirectional structural composite material.

In a further non-limiting embodiment of any of the foregoing traction battery packs, the structurally reinforced enclosure cover is arranged relative to the enclosure tray such that the structural cross member is received over a cross member of the enclosure tray.

In a further non-limiting embodiment of any of the foregoing traction battery packs, a first opening is formed through the enclosure cover and a second opening is formed in the cross member of the enclosure tray.

In a further non-limiting embodiment of any of the foregoing traction battery packs, the first opening is formed through both the overmold portion and the structural cross member.

In a further non-limiting embodiment of any of the foregoing traction battery packs, a mechanical fastener is received within the first opening and the second opening to secure the structurally reinforced enclosure cover to the enclosure tray.

In a further non-limiting embodiment of any of the foregoing traction battery packs, a gap extends between the cross member of the enclosure tray and an inner surface of the structurally reinforced enclosure cover.

A traction battery pack according to another exemplary aspect of the present disclosure includes, among other things, an outer enclosure assembly including an enclosure tray and a structurally reinforced enclosure cover, and a battery array housed inside the outer enclosure assembly. The structurally reinforced enclosure cover includes an overmold portion and a plurality of structural cross members encapsulated inside the overmold portion.

In a further non-limiting embodiment of the foregoing traction battery pack, the overmold portion is made of a polymer-based composite material.

In a further non-limiting embodiment of either of the foregoing traction battery packs, each of the plurality of structural cross members is made of a metallic material.

In a further non-limiting embodiment of any of the foregoing traction battery packs, each of the plurality of structural cross members is made of an unidirectional structural composite material.

In a further non-limiting embodiment of any of the foregoing traction battery packs, a mechanical fastener is received through at least one of the plurality of structural cross members and into a cross member of the enclosure tray.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary traction battery pack designs for use in electrified vehicles. An exemplary traction battery pack may include an outer enclosure assembly establishing an interior, and a battery array housed within the interior. A polymer-based enclosure cover of the outer enclosure assembly may be structurally reinforced by one or more structural cross-members. The structural cross members are designed to provide structural integrity to the enclosure cover during both normal operating conditions and thermal/venting events of the traction battery pack. These and other features are discussed in greater detail in the following paragraphs of this detailed description.

Figure 1:
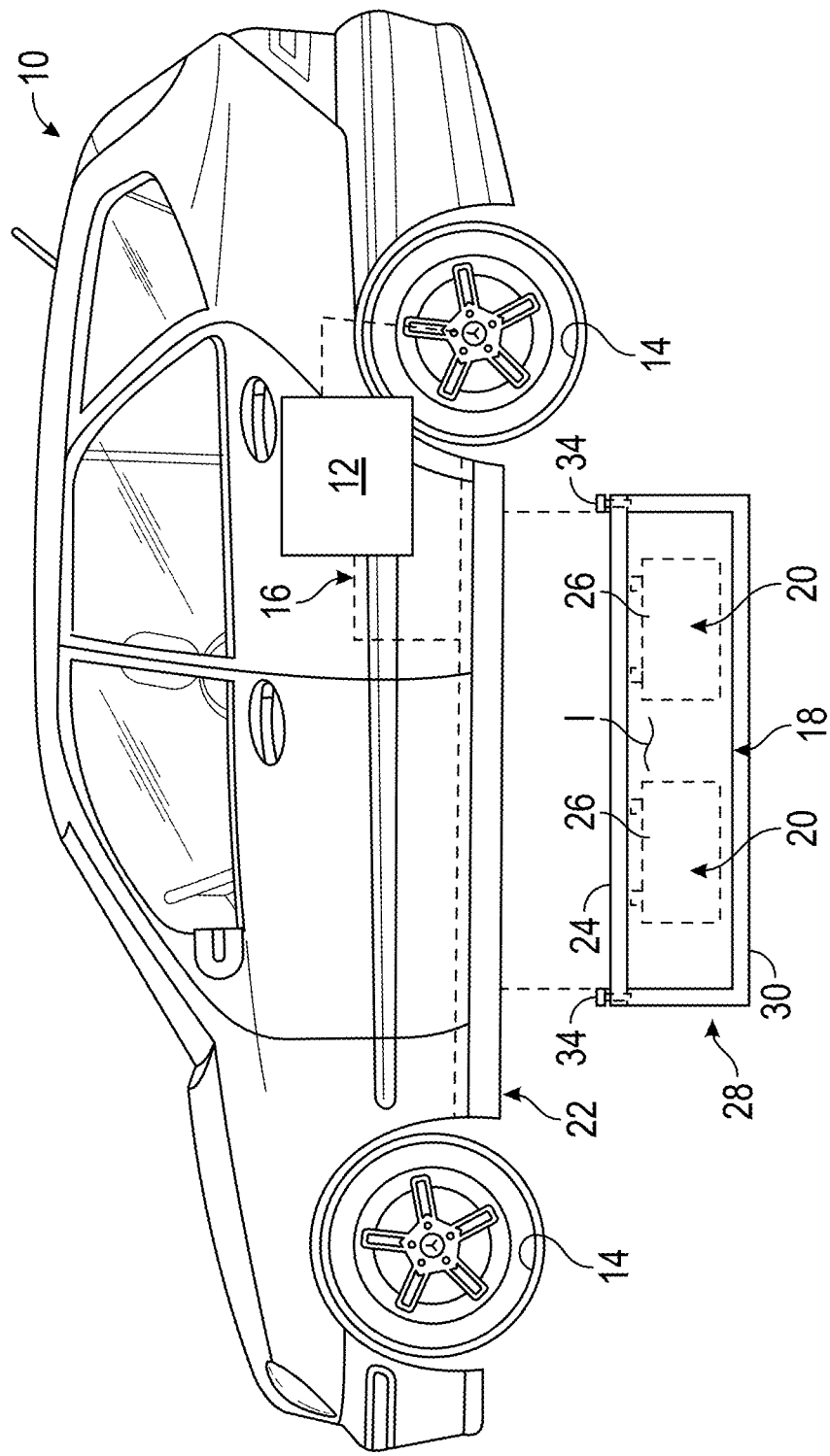
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in the exemplary embodiment, the electrified vehicle 10 could be equipped with an internal combustion engine that can be employed either alone or in combination with other power sources to propel the electrified vehicle 10.

In the illustrated embodiment, the electrified vehicle 10 is a sport utility vehicle (SUV). However, the electrified vehicle 10 could alternatively be a car, a van, a pickup truck, or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component or system.

In the illustrated embodiment, the electrified vehicle 10 is a full electric vehicle propelled solely through electric power, such as by one or more electric machines 12, without assistance from an internal combustion engine. The electric machine 12 may operate as an electric motor, an electric generator, or both. The electric machine 12 receives electrical power and can convert the electrical power to torque for driving one or more wheels 14 of the electrified vehicle 10.

A voltage bus 16 may electrically couple the electric machine 12 to a traction battery pack 18. The traction battery pack 18 is an exemplary electrified vehicle battery. The traction battery pack 18 may be a high voltage traction battery pack that includes one or more battery arrays 20 (i.e., battery assemblies or groupings of rechargeable battery cells 26) capable of outputting electrical power to power the electric machine 12 and/or other electrical loads of the electrified vehicle 10. Other types of energy storage devices and/or output devices could alternatively or additionally be used to electrically power the electrified vehicle 10.

The battery cells 26 may be stacked side-by-side along a stack axis to construct a grouping of battery cells 26, sometimes referred to as a "cell stack." In the highly schematic depiction of FIG. 1, the battery cells 26 are stacked in a direction into the page to construct each battery array 20, and thus the battery arrays 20 extend in cross-car direction. However, other configurations may also be possible.

The total number of battery arrays 20 and battery cells 26 provided within the traction battery pack 18 is not intended to limit this disclosure. In an embodiment, the battery cells 26 of each battery array 20 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The traction battery pack 18 may be secured to an underbody 22 of the electrified vehicle 10. However, the traction battery pack 18 could be located elsewhere on the electrified vehicle 10 within the scope of this disclosure.

An outer enclosure assembly 28 may house each battery array 20 of the traction battery pack 18. The outer enclosure assembly 28 may be a sealed enclosure and may embody any size, shape, and configuration within the scope of this disclosure. In an embodiment, the outer enclosure assembly 28 includes a structurally reinforced enclosure cover 24 and an enclosure tray 30. Together, the enclosure cover 24 and the enclosure tray 30 may establish an interior I for housing the battery arrays 20 and other battery internal components (e.g., bussed electrical center, battery electric control module, wiring, connectors, etc.) of the traction battery pack 18.

During assembly of the traction battery pack 18, the enclosure cover 24 may be secured to the enclosure tray 30 at an interface 32 therebetween. The interface 32 may substantially circumscribe the interior I. In some implementations, mechanical fasteners 34 may be used to secure the enclosure cover 24 to the enclosure tray 30, although other fastening methodologies (adhesion, etc.) could also be suitable.

In an embodiment, the outer enclosure assembly 28 includes one or more polymer-based components. For example, both the enclosure cover 24 and the enclosure tray 30 could be constructed (e.g., molded) of polymer-based materials (e.g., polypropylene, polystyrene, polyethylene, polyamine, etc.) or polymer-based composite materials (e.g., sheet moulding compounds, such as glass-fiber reinforced polyester, direct long fiber thermoplastics (DLFT), glass mat thermoplastics (GMT), etc.).

In another embodiment, the outer enclosure assembly 28 could be constructed of both metallic-based and polymer-based components. For example, the enclosure tray 30 could be a metallic-based component (e.g., steel or aluminum), and the enclosure cover 24 could be a polymer-based component. However, other configurations are also contemplated within the scope of this disclosure.

Incorporating polymer-based components into the outer enclosure assembly 28 can provide weight savings but at the expense of structural strength compared to metallic-based components. Moreover, the traction battery pack 18 may operate within a relatively high temperature environment. The outer enclosure assembly 28 typically must be designed to withstand the temperatures associated with such a high temperature environment. This disclosure is therefore directed to outer enclosure cover designs that are capable of providing structural integrity during both normal operating conditions and thermal/venting events of the traction battery pack while also providing weight savings compared to prior battery enclosure covers.

Figure 2:
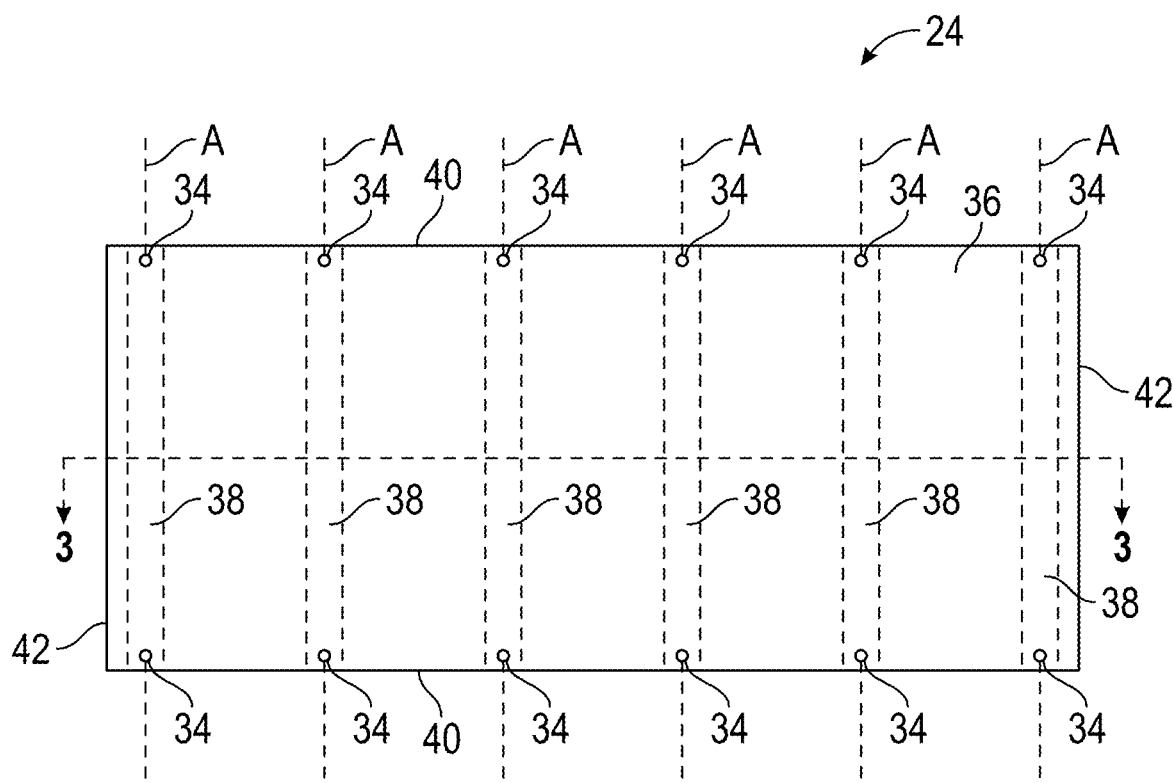
FIG. 2 is a top view of a structurally reinforced enclosure cover of an outer enclosure assembly of a traction battery pack.
Figure 3:
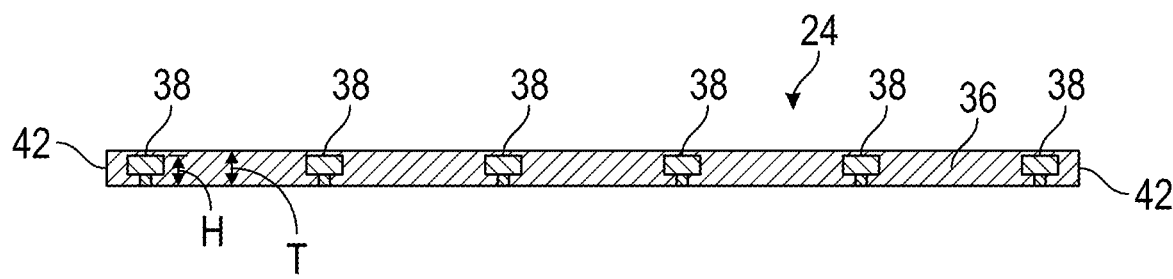
FIG. 3 is a cross-sectional view through section 3-3 of the structurally reinforced enclosure cover of FIG. 2.
Figure 4:
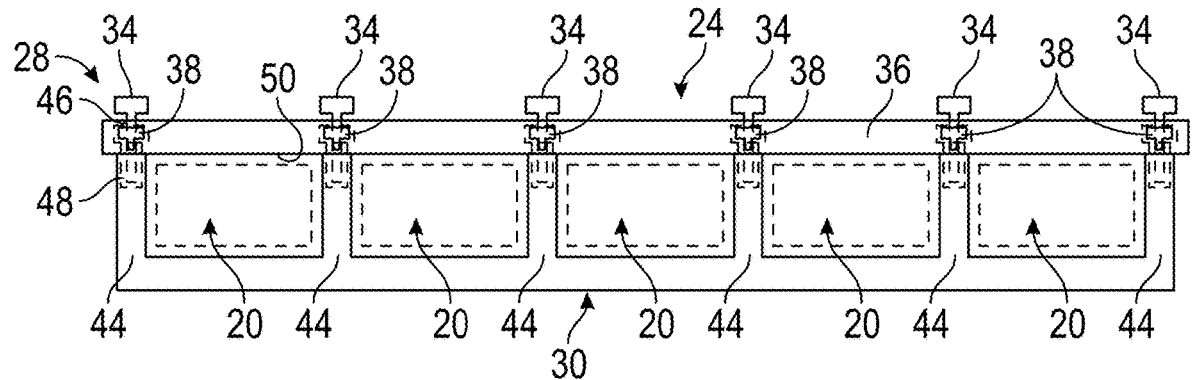
FIG. 4 illustrates an exemplary arrangement of a structurally reinforced enclosure cover relative to an enclosure tray of an outer enclosure assembly of a traction battery pack.

Referring to FIGS. 2, 3, and 4, with continued reference to FIG. 1, the enclosure cover 24 of the outer enclosure assembly 28 may include an overmold portion 36 and one or more structural cross members 38 encapsulated, embedded or otherwise provided inside the overmold portion 36. The structural cross members 38 are configured to structurally reinforce the enclosure cover 24 so that it is better equipped to withstand the relatively high structural demands of the traction battery pack 18 during both normal battery life cycles and cell thermal/venting events.

In the illustrated embodiment, a total of six structural cross members 38 are provided inside the enclosure cover 24. However, a greater or fewer number of structural cross members 38 could be provided depending on the stiffness requirements and/or other design specific criteria of the enclosure cover 24.

In an embodiment, the overmold portion 36 is overmolded around the structural cross members 38 during a molding process for forming the enclosure cover 24. The molding process may include positioning the pre-formed (e.g., molded, cast, machined, extruded, stamped, roll formed, etc.) structural cross members 38 in an injection molding tool, and then injecting a polymer-based material (e.g., polypropylene, polystyrene, polyethylene, polyamine, etc.) or a polymer-based composite material (e.g., sheet moulding compound, direct long fiber thermoplastics (DLFT), glass mat thermoplastics (GMT), etc.) around the structural cross members 38 to form the overmold portion 36. By virtue of the molding process, the structural cross members 38 are captured within a material make-up of the overmold portion 36.

In an embodiment, each structural cross member 38 may be made of a metallic-based material (e.g., steel, aluminum, etc.). In another embodiment, the structural cross members 38 may be made of a unidirectional structural composite material (e.g., a pultrusion). However, other materials are also contemplated within the scope of this disclosure.

Each structural cross member 38 may extend along a longitudinal axis A between major sides 40 of the overmold portion 36. Minor sides 42 of the overmold portion 36 may connect between the major sides 40. However, other arrangements and configurations are further contemplated within the scope of this disclosure.

In an embodiment, each structural cross member 38 includes a T-shaped profile. However, the structural cross members 38 could include any profile that facilitates a strong mechanical interlock between the material of the overmold portion 36 and the substrate of the structural cross members 38 during the molding process.

Each structural cross member 38 may further include a height H, which is generally shorter than a thickness T of the overmold portion 36. The height H may be tuned to provide a desired level of stiffness of the enclosure cover 24. In general, increasing the height H results in increasing the overall stiffness of the enclosure cover 24.

Figure 5:
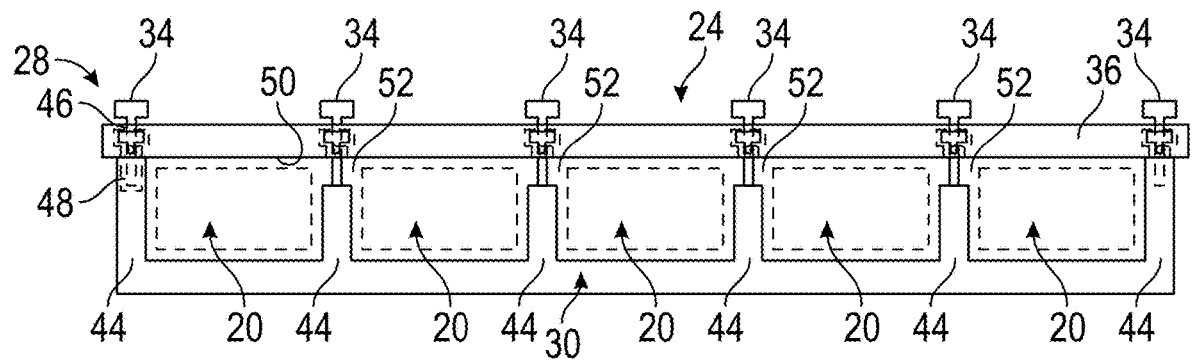
FIG. 5 illustrates another exemplary arrangement of a structurally reinforced enclosure cover relative to an enclosure tray of an outer enclosure assembly of a traction battery pack.

Referring now to FIGS. 4 and 5, the structurally reinforced enclosure cover 24 may be positioned and secured relative to the enclosure tray 30 for providing the outer enclosure assembly 28. In an embodiment, the enclosure cover 24 may be arranged such that the structural cross members 38 are received in alignment with cross members 44 of the enclosure tray 30. The cross members 44 may be relatively rigid structures arranged to add rigidity to the enclosure tray 30. Each cross member 44 may be disposed axially between adjacent battery arrays 20 or rows of battery arrays 20 of the traction battery pack 18. In some implementations, the cross members 44 may abut an inner surface 50 of the enclosure cover 24 (see FIG. 4). In other implementations, a gap 52 may extend between the inner surface 50 and at least a portion of the cross members 44 (see FIG. 5).

Once the enclosure cover 24 is appropriately positioned over the enclosure tray 30, the enclosure cover 24 may be mechanically secured to the enclosure tray 30 using one or more mechanical fasteners 34 (e.g., bolts, adhesives, etc.). In an embodiment, the mechanical fasteners 34 are bolts that may be inserted through first openings 46 formed through the enclosure cover 24 and second openings 48 formed in the cross members 44 of the enclosure tray 30. The first openings 46 may extend through both the overmold portion 36 and the structural cross members 38 of the enclosure cover 24.

The exemplary traction battery packs of this disclosure incorporate structurally reinforced enclosure cover structures. The structurally reinforced enclosure cover structures are designed to augment the structural integrity of the cover while further providing weight savings compared to prior enclosure cover designs.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A traction battery pack, comprising:
an outer enclosure assembly including a structurally reinforced enclosure cover and an enclosure tray;
wherein the structurally reinforced enclosure cover includes an overmold portion and a structural cross member encapsulated inside the overmold portion.

2. The traction battery pack as recited in claim 1, wherein the structurally reinforced enclosure cover includes a plurality of structural cross members arranged inside the overmold portion.

3. The traction battery pack as recited in claim 1, wherein the structural cross member includes a T-shaped profile.

4. The traction battery pack as recited in claim 1, wherein the overmold portion includes a polymer-based material.

5. The traction battery pack as recited in claim 1, wherein the overmold portion includes a polymer-based composite material.

6. The traction battery pack as recited in claim 5, wherein the polymer-based composite material includes a sheet moulding compound.

7. The traction battery pack as recited in claim 5, wherein the polymer-based composite material includes a direct long fiber thermoplastic.

8. The traction battery pack as recited in claim 5, wherein the polymer-based composite material includes a glass mat thermoplastic (GMT).

9. The traction battery pack as recited in claim 1, wherein the structural cross member includes a metallic material.

10. The traction battery pack as recited in claim 1, wherein the structural cross member includes an unidirectional structural composite material.

11. The traction battery pack as recited in claim 1, wherein the structurally reinforced enclosure cover is arranged relative to the enclosure tray such that the structural cross member is received over a cross member of the enclosure tray.

12. The traction battery pack as recited in claim 11, comprising a first opening formed through the structurally reinforced enclosure cover and a second opening formed in the cross member of the enclosure tray.

13. The traction battery pack as recited in claim 12, wherein the first opening is formed through both the overmold portion and the structural cross member.

14. The traction battery pack as recited in claim 12, comprising a mechanical fastener received within the first opening and the second opening to secure the structurally reinforced enclosure cover to the enclosure tray.

15. The traction battery pack as recited in claim 11, wherein a gap extends between the cross member of the enclosure tray and an inner surface of the structurally reinforced enclosure cover.

16. A traction battery pack, comprising:
   an outer enclosure assembly including an enclosure tray and a structurally reinforced enclosure cover; and
   a battery array housed inside the outer enclosure assembly,
   wherein the structurally reinforced enclosure cover includes an overmold portion and a plurality of structural cross members encapsulated inside the overmold portion.

17. The traction battery pack as recited in claim 16, wherein the overmold portion is made of a polymer-based composite material.

18. The traction battery pack as recited in claim 16, wherein each of the plurality of structural cross members is made of a metallic material.

19. The traction battery pack as recited in claim 16, wherein each of the plurality of structural cross members is made of an unidirectional structural composite material.

20. A traction battery pack, comprising:
   an outer enclosure assembly including an enclosure tray and a structurally reinforced enclosure cover;
   a battery array housed inside the outer enclosure assembly,
   wherein the structurally reinforced enclosure cover includes an overmold portion and a plurality of structural cross members encapsulated inside the overmold portion; and
   a mechanical fastener received through at least one of the plurality of structural cross members and into a cross member of the enclosure tray.

* * * * *